(No Model.)
R. P. LOVEJOY.
ROPE FIRE ESCAPE.
No. 387,650. Patented Aug. 14, 1888.
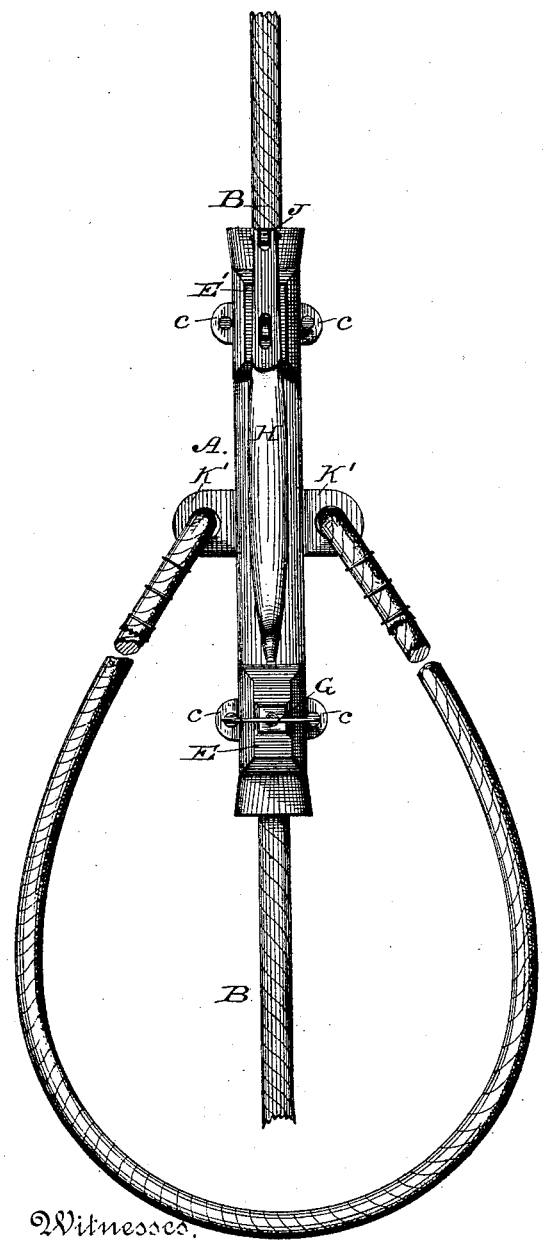
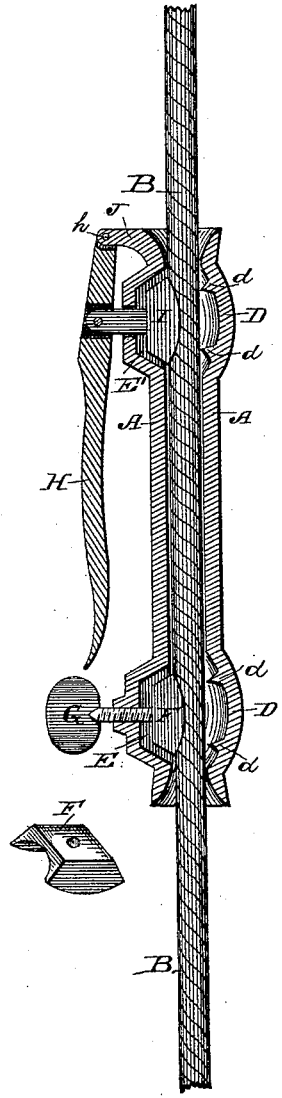
Witnesses
Jos. H. Blackwood
Cont. A. Cooper
Inventor.
Russell P. Lovejoy.
By J. Carroll House,
his Attorney.

United States Patent Office.

RUSSELL P. LOVEJOY, OF CARTHAGE, NEW YORK.

ROPE FIRE-ESCAPE.

SPECIFICATION forming part of Letters Patent No. 387,650, dated August 14, 1888.

Application filed November 25, 1887. Serial No. 256,096. (No model.)

*To all whom it may concern:*

Be it known that I, RUSSELL P. LOVEJOY, a citizen of the United States, residing at Carthage, in the county of Jefferson and State of New York, have invented a new and useful Improvement in Rope Fire-Escapes, of which the following is a specification, reference being had to the accompanying drawings, in which—

Figure 1 is a view looking down upon the hand-lever side of the sliding tube inclosing the rope. Fig. 2 is a vertical section taken through the lever and tube.

Similar letters refer to similar parts in both drawings.

My invention has reference to that class of portable or detachable apparatus for escape from buildings on fire, in which the person is dependent upon a rope, cord, or wire secured at one end to some sufficiently secure attachment within the structure from which escape is to be made, the opposite end reaching the ground or place of safety.

The invention specially relates to a device by which the person so escaping has the rate of motion and descent entirely under his control, and so easily and perfectly at command that the merest child can govern and control the action of the apparatus with the greatest ease and safety.

In the drawings, B represents the rope escape dropped from the point of escape to the ground and made fast at its upper end, as may be convenient. Encircling the rope and sliding freely thereon, when left to itself, is the tubular device A A, having each end sufficiently enlarged or trumpet-shaped to avoid fraying the rope which it embraces. This tube is made in two longitudinal sections, each furnished with a pair of small ears, c c, near each end, which serve, when the sections are in place, as retainers for the screws, binding the sections together. Another but much larger pair of perforated ears is placed about the center of each of the sections, which, as the same are in place, constitute a pair of stout rings, K' K', to which may be attached a strong loop of rope or webbing of sufficient length to form a swing encircling the body of the person using the device. One section of the tube is enlarged at D D near the ends, and within these depressions are one or more transverse ridges or blunt angular projections, as at d d, the inner apices of said ridges being about on a line with the internal diameter of the cylindrical portion of the tube. Opposite these sets of projections the companion section is arranged with conical-shaped chambers E and E', one of these, E, being tapped and furnished with the thumb-screw G. Within the chamber there is a loosely-fitting saddle-block, F, against the outer surface of which the end of the thumb-screw G is made to engage, and by which the position of the saddle-block is controlled and governed. When thrown forward from the crown of the chamber, the space between the concave and rounding face of the block and the ridges within the part D is constricted. Within the other compartment, E', is a similar saddle-block, I; but this is furnished with a stout stem passing through a suitable opening in the crown of the compartment, and is extended so as to pass through a mortise in the lever H. This lever has its bearing at one end in a projection, J, upon the end of the tube and turning upon the fulcrum-bolt $h$, the opposite end of the lever being extended nearly to the screw G and fashioned to engage the thumb of the party using the device.

Operation: When in service, the party using the device first makes one end of the rope B, upon which the tubular mechanism slides, secure to some safe attachment, the other end of the rope being dropped to the ground beneath. The swing, secured to the rings K K, is adjusted about the body, so that it constitutes a seat, and bringing the tubular device about opposite the breast or chin and with the lever H toward the person. The saddle-block F is now to be forced against the surface of the rope by the screw G until the projections d'd engage the opposite side of the rope with sufficient friction to about counterbalance the weight of the person depending from the attached swing.

With this adjustment made, the party, grasping the device in the right hand and with the thumb upon the lever H, now swings off the window or place from which to escape, passes gently down the rope, the rate of descent being entirely governed by the amount of pressure placed upon the block I through the lever H as the rope passes the opposing ridges $d\ d$, superadded to the adjusted bearing of the block F. So complete is this control that if the rope is of reasonably even size the adjustment may be made so nicely that but a very light pressure upon the lever will be sufficient to retard or entirely stop the descent of the person, giving the party full control of his motion. Should it be necessary to swing clear of smoke or flames from lower windows, parties on the ground can carry the lower extremity of the rope some distance away from the building, which will take the occupant of the escape out of reach of the ascending smoke or flame.

It matters little which end of the tubular device is up, as it works equally well either way on the rope. If it is desired, a party remaining in the building after one has made the descent can haul the rope back with the swing, and untying what was the fast end secures in its place that which was the ground or free end, and throwing the other back to the ground may safely descend with brake device reversed.

I claim—

1. In a rope fire-escape, the special device encircling the rope, wire, or cable, consisting of the hollow tubular device A A, with trumpet-shaped ends, the enlarged portions D D, with the frictional bearing-ridges $d\ d$, antagonized by the adjustable bearing-saddles F and I, the former being controlled by the thumb-screw G and the latter actuated by and under the control of the thumb-lever H, as shown and described.

2. A tubular device in two longitudinal sections, each having three pairs of flat perforated projections, one pair near each end, which shall serve for receiving retaining screws or rivets, binding the sections together, while the third and much larger pair are near the center and constitute, when the sections are together, a pair of stout rings for the attachment of a loop or swing-seat for the occupant of said escape.

RUSSELL P. LOVEJOY.

Witnesses:
W. T. BUSH,
J. C. HOUSE.